(12) United States Patent
Fuhrmann et al.

(10) Patent No.: US 6,347,218 B1
(45) Date of Patent: *Feb. 12, 2002

(54) ELECTRONIC DEVICE WITH HOUSING SUPPLEMENT

(75) Inventors: Thomas Fuhrmann, Dulmen/Buldern; Annett Wilke, Bochum; Dirk Umbach, Hattingen, all of (DE)

(73) Assignee: Nokia Mobile Phones Limited, Salo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,591

(22) Filed: Feb. 18, 1997

(30) Foreign Application Priority Data

Feb. 28, 1996 (EP) ............................................. 96102988

(51) Int. Cl.⁷ .................................................. H04B 1/38
(52) U.S. Cl. .......................... 455/90; 455/128; 455/348; 379/433.11
(58) Field of Search .......................... 455/90, 550, 575, 455/128, 347, 348, 351, 566; 379/433, 428, 439, 441, 568, 369, 440, 451, 452, 453, 433.11; D14/138, 247, 250

(56) References Cited

U.S. PATENT DOCUMENTS

| 4,142,312 A | * 3/1979 | Stokes ........................ 379/368 |
| 4,179,591 A | 12/1979 | Becker ........................ 179/179 |
| 4,292,481 A | * 9/1981 | Barnes et al. ................ 379/441 |
| D262,214 S | * 12/1981 | Obst .......................... D14/250 |
| 4,433,216 A | 2/1984 | Isaacs ........................ 179/178 |
| 4,621,373 A | * 11/1986 | Hodsdon .................... 455/128 |
| 4,679,231 A | * 7/1987 | Reichle ....................... 379/429 |
| 4,945,633 A | 8/1990 | Hakanen et al. ............... 29/825 |
| 5,036,432 A | 7/1991 | Uronen et al. ............... 361/422 |
| 5,045,973 A | 9/1991 | Saarela et al. ............... 361/395 |
| 5,096,317 A | * 3/1992 | Phillippe .................... 400/714 |
| 5,134,654 A | 7/1992 | McGough .................... 379/428 |
| 5,140,632 A | 8/1992 | Anten ........................ 379/447 |
| 5,146,615 A | 9/1992 | Hodsdon et al. .............. 455/90 |
| 5,175,873 A | * 12/1992 | Goldenberg et al. ......... 455/128 |
| 5,235,636 A | 8/1993 | Takagi et al. ................ 379/368 |
| 5,357,570 A | 10/1994 | Tomura et al. ............... 379/433 |
| 5,509,057 A | * 4/1996 | Anello et al. ................ 379/145 |
| 5,577,267 A | * 11/1996 | Jungles-Butler et al. ..... 455/128 |
| D385,876 S | * 11/1997 | Park ........................ D14/138 |
| D385,887 S | * 11/1997 | Park ........................ D14/138 |
| 5,733,023 A | * 3/1998 | Lee .......................... 312/208.3 |
| 5,848,152 A | 12/1998 | Slipy et al. ................. 379/433 |
| 5,982,881 A | 11/1999 | Mischenko ................. 379/433 |

FOREIGN PATENT DOCUMENTS

GB 2293517 3/1996

OTHER PUBLICATIONS

Exhibit 1 showing front cover of the Nokia Model 2110 Mobile Telephone, 1995, submitted by applicant.*

* cited by examiner

Primary Examiner—Nguyen T. Vo
(74) Attorney, Agent, or Firm—Perman & Green, LLP

(57) ABSTRACT

The invention relates to an electronic device having a housing (1) which has a housing wall (5) with openings (7) for control elements (8) and/or display elements (9, 10). Attachment device (11) for detachably connecting to the housing (1) an external wall element (14) which at least partially covers the housing wall (5) being present on the housing (1), the external wall element (14) having openings (7') which are aligned with the openings (7) in the housing wall (5). As a result, by using different external wall elements (14) the external appearance of the electronic device can be easily modified.

7 Claims, 3 Drawing Sheets

ELECTRONIC DEVICE WITH HOUSING SUPPLEMENT

BACKGROUND OF THE INVENTION

The invention relates to an electronic device having a housing which has a housing wall with openings for control and/or display elements.

An electronic device of this kind may be for example a telephone, a cordless phone or mobile phone, a pocket calculator, a television set, a radio receiver or for example another electronic domestic appliance which, as a rule, is used by private individuals. If, for personal reasons or because of predetermined requirements, the external appearance of such an electronic device, for example the shape of the housing or its colour, is to be modified, as a rule this must be carried out by a specialist since during such an operation the electronic components present in the housing of the electronic device are usually exposed. Modification of the appearance of the housing of the electronic device is thus laborious, time-consuming and expensive and, moreover, can as a rule only rarely be carried out by private individuals.

SUMMARY OF THE INVENTION

In accordance with the invention there is provided an electronic device having a housing which has a housing wall with openings for control elements and/or display elements, characterized by attachment means for detachably connecting to the housing an external wall element which at least partially covers the housing wall, the external wall element having openings which are aligned with the openings in the housing wall. Advantageous refinements of the invention can be found in the subclaims.

An electronic device in accordance with the invention allows the external appearance of the housing to be modified rapidly and easily even by non-professionals.

With the electronic device according to the invention, a user thus has the possibility of modifying the appearance or design of the housing in an extremely short time and without any difficulty by selecting and fitting on an appropriate external wall element. The user can thus more or less change the housing according to his wishes if external elements with different shapes and colours are available to him for this purpose. Even external wall elements made of different materials are possible.

When the housing wall provided with openings is covered by the external wall element, the openings provided in the housing wall and in the external wall element are aligned with one another so that for example the push-button keys which project through the openings can continue to be used even after the external wall element is fitted on to the housing wall or display elements which are inserted into the openings can continue to be read. This also applies to microphones or loudspeakers inserted into opening, for example in the case of cordless telephones.

With the electronic device according to the invention, the electronics provided in the device are always protected against access by the customer when the external appearance of the housing is modified. Therefore, if one external wall element is to be replaced by another in order to give the electronic device a new design, there is no risk of the electronics present in the housing being damaged when the external wall elements are interchanged or of the user being subjected to danger by the electronics present Inside the housing. In this respect, the external wall elements could even be interchanged when an electronic device is operating.

According to an advantageous refinement of the invention, the external wall element can engage, at least partially, over further housing walls of the housing so that the design of the housing can be modified to an even greater extent or adapted to the wishes of the user to an even greater degree.

At the same time, the profile of the external wall element can follow the profile of the housing walls of the housing if emphasis is being placed not so much on the modification of the shape of the housing but rather on changing the colour or the type of material of the housing. However, the external wall elements can of course have different shapes which can also deviate from one another to a greater degree provided it is ensured that after the respective external wall elements have been connected to the housing the respective openings in the fitted-on external wall element and in the housing wall in question are aligned with one another.

According to a very advantageous development of the invention, the external wall element can be of, for example, shell-shaped design so that it can be fitted for example with one edge on to a base which projects outwards beyond the side walls of the housing.

Any desired attachment means can be used to attach the external wall element to the housing of the electronic device, but attachment means with press-on/catch closure can preferably be used. They ensure a secure connection between the external wall element and the housing and, moreover, can be easily used without a special tool being required for them.

BRIEF DESCRIPTION OF THE DRAWINGS

The invention is explained in detail below with reference to the drawing, in which:

FIG. 2 shows the cordless or mobile phone according to FIG. 1 with the external wall element fitted on;

DETAILED DESCRIPTION OF THE INVENTION

The invention is explained below with reference to a cordless telephone or mobile phone which serves as an example of an electronic device. However, the invention can also be used in other electronic devices, for example in wire-connected telephones, in pocket calculators, in television sets, in radio receivers, in CD players, in cassette recorders etc.

Figure 1:
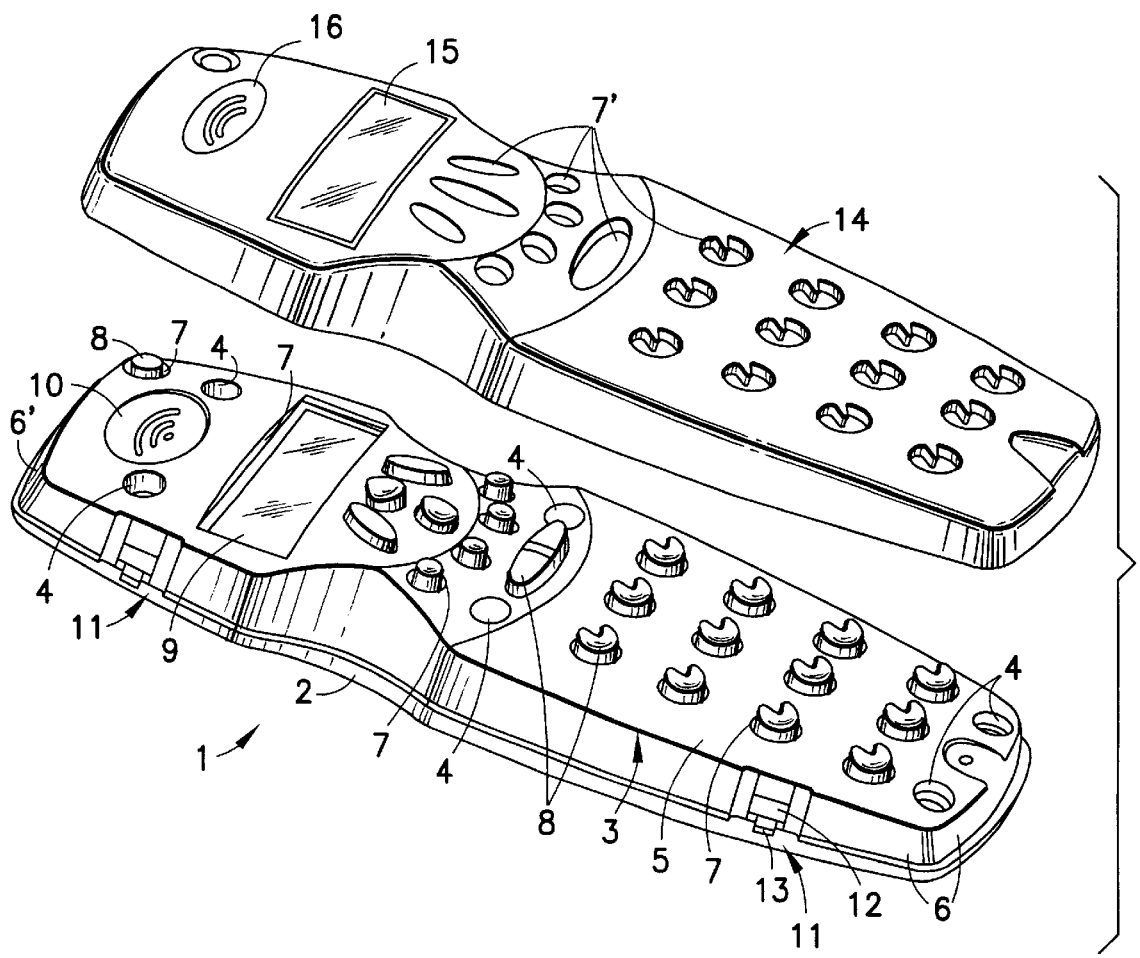
FIG. 1 shows a cordless telephone or mobile phone with external wall element removed.

In accordance with FIG. 1, a cordless telephone or mobile phone according to the invention has a housing 1 with which a plate-shaped base element 2 and a shell-shaped housing element 3 are associated. The plate-shaped based element 2 and the shell-shaped housing element 3 are connected to one another using screws (not illustrated) which project through openings 4 in the shell-shaped housing element 3 and are screwed into sockets (not illustrated) which are fixedly connected to the inside of the plate-shaped base element 2. Inside the housing 1 there is a carrier plate, attached in a suitable way, for electronic components etc.

The shell-shaped housing element 3 has a housing wall 5 which is located essentially parallel with the plate-shaped base element 2 and at a distance therefrom and is integrally connected to side walls 6 which are supported with their free or lower edge on the plate-shaped base element 2. In this arrangement, the plate-shaped base element 2 projects outwards beyond the side walls 6 by constant distance in its edge region so that a profile with an identical contour is obtained.

In the housing wall 5 there is a plurality of through-openings 7 for electronic components which are mounted on the carrier plate, already mentioned, inside the housing 1, and partially project through the through-openings 7. The through-openings 7 can be provided for example for push-button keys 8, for a display device 9 or for a loudspeaker device/microphone device 10. A corresponding through-opening 7 may also be present in the upper side wall 6 for an aerial.

On the side walls 6, extending in the longitudinal direction of the housing 1, of the shell-shaped housing element 3 there are also in each case two attachment means 11 which are designed as press-on/catch closures at a distance from one another. They are located in each case at the front and rear ends of the telephone. The attachment means 11 have a catch projection 12 which is prestressed outwards in a sprung fashion and can be pressed inwards into the housing 1 counter to the outwardly acting spring force by means of an externally accessible activation element 13. These attachment means serve to attach to the housing 1 an external wall element 14 which is fitted on to the shell-shaped housing element 3 and is also of shell-shaped design.

Figure 3:
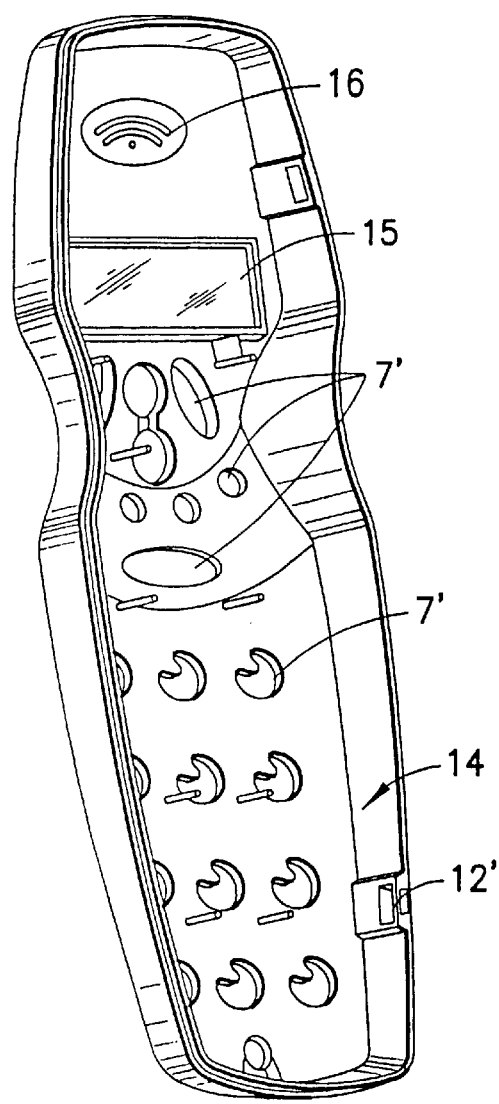
FIG. 3 shows the external wall element from the underside.

The shell-shaped external wall element 14 which is illustrated in FIGS. 1 and 3 has approximately the same contour as the shell-shaped housing element 3 but is designed in such a way that it can receive the shell-shaped housing element 3 nested within it. If the external wall element 14, which is designed as a thin-walled shell, is fitted on to the shell-shaped housing element 3, the shell-shaped external wall element 14 is supported with the free or downwardly pointing edge of its side walls on that part of the plate-shaped base element 2 which projects outwards beyond the shell-shaped housing element 3. Here, the wall thickness of the side walls of the shell-shaped external wall element 14 corresponds to the distance by which the edge of the plate-shaped base element 2 projects outwards beyond the side walls 6, 6' of the shell-shaped housing element 3. As a result, no step remains in the connection area between the shell-shaped external wall element 14 and the plate-shaped base element 2. The height of the side walls of the shell-shaped external wall element 14 can be selected here such that the main face of the external wall element 14 comes to rest at a short distance from the housing wall 5 and as a result does not exert any pressure on the latter.

Likewise, uncovered openings 7' which are aligned with the openings 7 in the housing wall 5 of the shell-shaped housing element 3 are provided in the main face of the external wall element 14. Therefore, it is possible to continue to operate the telephone even when the external wall element 14 is fitted on to the shell-shaped housing element 3. At the same time, the push-button keys 8 can be of such a height that they also project outwards beyond the external wall element 14 and are exposed for use. Openings which are present in the external wall element 14 for the display device 9 and the loudspeaker device/microphone device 10 can be covered, for example by means of a transparent element 15 or a grill 16.

Figure 2:
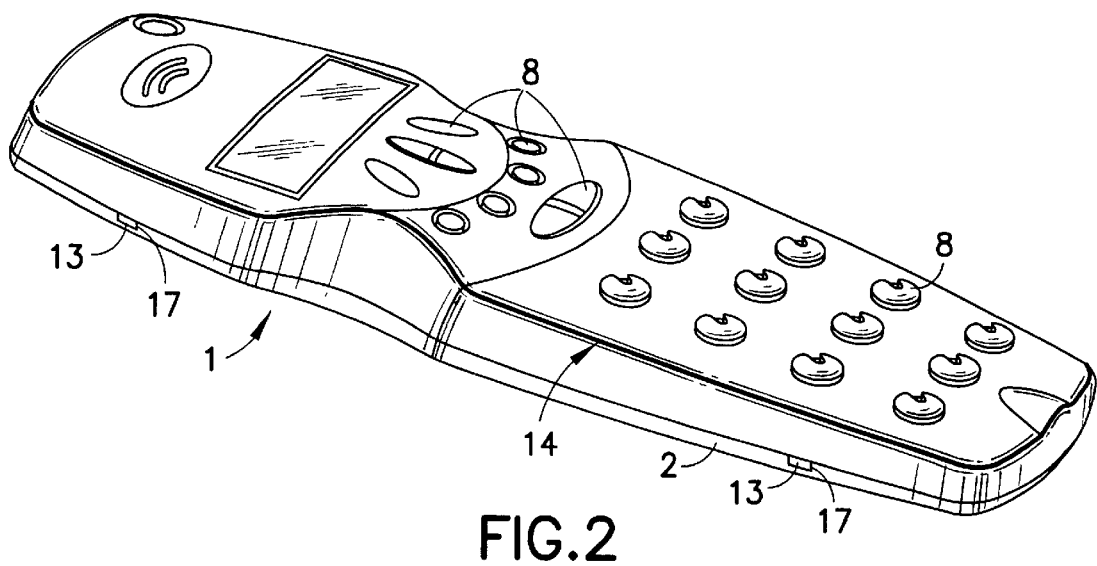
Figure 4:
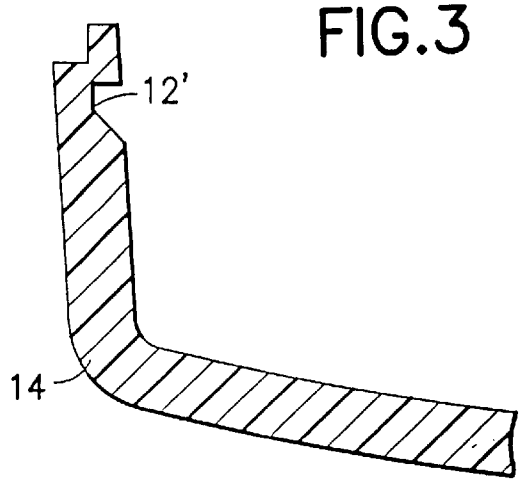
FIG. 4 shows a section through the wall of the external wall element.

FIG. 2 shows the cordless telephone or mobile phone in a state in which the shell-shaped external wall element 14 is fitted on to the shell-shaped housing element 3 and is detachably connected to the housing 1. On the internal faces of the long side walls of the external wall element 14 there are notches 12', one of which is seen in section in FIG. 4, for the catch projections 12 of the attachment means 11 so that the catch projections 12 engage in the notches 12' as a result of the outwardly pressing spring force, and thus hold the external wall element on the housing 1. In this state, the activation elements 13 are also pushed outwards but only to such an extent that they do not project beyond the side edge of the plate-shaped base element 2 or of the external wall element 14. The activation elements 13 can extend here in a groove 17 in the upper face of the plate-shaped base element 2. If the activation elements 13 are pressed inwards, that is to say inwards along the groove 17, for example using a pointed object, they move the catch projections 12 correspondingly inwards along with them so that the said catch projections 12 disengage from the notches 12' on the inside of the side walls 6 of the external wall element 14. The external wall element 14 can then be removed from the housing 1.

The external wall element 14 Is fitted on to the housing 1 by simply pressing it on. The catch projections 12 then engage automatically in the notches 12'.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled In the art that various modifications may be made within the scope of the invention.

What is claimed is:

1. A hand held communication device comprising:
at least one element for input by a user and at least one element for output to the user, each one of said elements being sufficiently exposed to allow use by a user;
a housing having a housing wall with openings therethrough, comprising openings for the at least one element for input by the user and the at least one element for output to the user;
a user attachable/detachable external non-planar cover attached to and at least partially covering the housing wherein the detachability provides for user interchange with another non-planar cover thereby facilitating user modification of the external appearance of the hand held communications device, the external non-planar cover being adapted to fit over the housing with the housing partially nested within the external non-planar cover, the cover comprising a main face having an upper surface which is exposed when the cover is attached to the housing and a side wall extending downwards, away from the upper surface of the main face, the main face of the cover and at least portions of the side wall of the cover defining a cavity sized to receive a portion of the housing when attached thereto, the cover having a plurality of apertures therethrough to the cavity positioned over and aligned with openings in the housing including the opening for the at least one element for input by the user and the opening for the at least one element for output to the user, whereby each one of said input and output elements is sufficiently exposed to allow use by a user;
at least one user releasable retainer, holding the cover to the housing, formed by contact between the housing and the downwardly extending side wall of the cover, said retainer being releasable by the user without employing a tool, wherein the hand held device is fully functional when the cover is attached;

and wherein at least portions of the side wall of the external, non-planar cover terminate at a free, downwardly pointing edge and the housing has, where the housing nests within the external non-planar cover, upwardly facing ledge-like portions which project beyond the side wall of the housing, whereby the free downwardly pointing edge portions of the external non-planar cover oppose the projecting, upwardly facing ledge-like portions of the housing and substantially follow the contours of the projecting ledge-like portions.

2. A hand held communication device as claimed in claim 1, wherein the width of the side wall of the external element at the free edge substantially equals the width of the ledge-like portion is opposes, whereby substantially no ledge remains in the connection area between the cover and the housing.

3. A hand held communication device as claimed in claim 2, wherein the profile of the external non-planar cover follows the profile of the housing wall of the housing.

4. A hand held communication device as claimed in claim 3, wherein the height of the side walls of the external non-planar cover are such that the main face of the external non-planar cover comes to rest at a distance from the housing wall and does not exert any pressure thereon.

5. A handheld radio communication device having electronic components connected to a carrier plate comprising:

a housing substantially enclosing the electronic components connected to the carrier plate, the housing including openings for control elements for the electronic components, the housing protecting the electronic components from access by a user of the device, the housing being adapted to receive a detachable external wall element and said housing having a base portion which projects beyond the side walls of the housing and on to which the external wall element can be fitted with its free edge opposing the base portion which projects beyond the side walls, the housing further including a plurality of housing walls, including first, second and third housing walls, the first housing wall having the openings arranged to receive the control elements for the electronic components, the external wall element at least partially covering the first, second and third housing walls and an attachment means having formations for detachably connecting to the exterior of the housing the external wall element;

a detachable external wall element adapted to overlie a portion of the housing, the external wall element being sized and shaped to at least partially cover the housing upon attachment thereto, the external wall element having a face portion with openings corresponding to the housing openings for the control elements, which the face portion will overlie upon attachment of the external wall element to the housing, each of the external wall element openings for the control elements being uncovered and exposed for use after attachment of the external wall element to the housing, the profile of the external wall element corresponding to the profile of the first, second and third housing walls;

each of the housing and the external wall element having at least one wall to create shell shaped configurations, so that when the face of the external wall element overlies the portion of the housing, the at least one wall of the external wall element overlies, the at least one wall of the housing, the shell shaped configuration of the external wall element and the shell shaped configuration of the housing correspond so that the external wall element is adapted to fit over the housing with the housing nested within the external wall element; and the attachment means being formed cooperatively on each of the at least one wall of the housing and the at least one wall of the external wall element for detachably connecting to the housing the external wall element, comprising a snap-in-place releasable connection.

6. A handheld radio communication device having electronic components connected to a carrier plate comprising:

a housing substantially enclosing the electronic components connected to the carrier plate, the housing including openings for control elements for the electronic components, the housing protecting the electronic components from access by a user of the device, the housing being adapted to receive a detachable external wall element and said housing having a base portion which projects beyond the side walls of the housing and on to which the external wall element can be fitted with its free edge opposing the base portion which projects beyond the side walls, the housing having a plurality of housing walls, including first second and third housing walls, the first housing wall having the openings arranged to receive the control elements for the electronic components, the external wall element at least partially covering the first, second and third housing walls and an attachment means having formations for detachably connecting to the exterior of the housing the external wall element;

a detachable external wall element adapted to overlie a portion of the housing, the external wall element being sized and shaped to at least partially cover the housing upon attachment thereto, the external wall element having a face portion with openings corresponding to the housing openings for the control elements, which the face portion will overlie upon attachment of the external wall element to the housing, each of the external wall element openings for the control elements being uncovered and exposed for use after attachment of the external wall element to the housing, the profile of the external wall element corresponding to the profile of the first, second and third housing walls;

each of the housing and the external wall element having at least one wall to create shell shaped configurations, so that when the face of the external wall element overlies the portion of the housing, the at least one wall of the external wall element overlies the portion of the housing, the at least one wall of the external wall element overlies the at least one wall of the housing, the shell shaped configuration of the external wall element and the shell shaped configuration of the housing correspond so that the external wall element is adapted to fit over the housing with the housing nested within the external wall element; and the attachment means being formed cooperatively on each of the at least one wall of the housing and the at least one wall of the external wall element for detachably connecting to the housing the external wall element, said attachment means comprising a press-on/catch closure.

7. A handheld radio communication device comprising a cordless telephone as a mobile telephone having electronic components connected to a carrier plate comprising:

a housing substantially enclosing the electronic components connected to the carrier plate, the housing including openings for control elements for the electronic components, the housing protecting the electronic components from access by a user of the device, the housing being adapted to receive a detachable external wall element and said housing having a base portion which projects beyond the side walls of the housing and on to which the external well element can be fitted with its free edge opposing the base portion which projects beyond the side walls, the housing having a plurality of housing walls, including first, second and third housing walls, the first housing wall having the openings arranged to receive the control elements for the electronic components, the external wall element at least partially covering the first, second and third housing walls and an attachment means having formations for detachably connecting to the exterior of the housing the external wall element;

a detachable external wall element adapted to overlie a portion of the housing, the external wall element being sized and shaped to at least partially cover the housing upon attachment thereto, the external wall element having a face portion with openings corresponding to the housing openings for the control elements, which the face portion will overlie upon attachment of the external wall element to the housing, each of the external wall element openings for the control elements being uncovered and exposed for use after attachment of the external wall element to the housing, the profile of the external wall element corresponding to the profile of the first, second and third housing walls; and each of the housing and the external wall element having at least one wall to create shell shaped configurations, so that when the face of the external wall element overlies the portion of the housing, the at least one wall of the external wall element overlies the portion of the housing, the at least one wall of the external wall element overlies the at least one wall of the housing; and the shell shaped configuration of the external wall element and the shell shaped configuration of the housing correspond so that the external wall element is adapted to fit over the housing with the housing nested within the external wall element;

the attachment means being formed cooperatively on each of the at least one wall of the housing and the at least one wall of the external wall element for detachably connecting to the housing the external wall element, comprising a snap-in-place releasable connection.

* * * * *